United States Patent
Wallner

[11] Patent Number: 5,310,215
[45] Date of Patent: May 10, 1994

[54] APPARATUS FOR VENTING OF AN INFLATABLE AIR BAG

[75] Inventor: John P. Wallner, Rochester Hills, Mich.

[73] Assignee: TRW Vehicle Safety Systems Inc., Lyndhurst, Ohio

[21] Appl. No.: 3,558

[22] Filed: Jan. 13, 1993

[51] Int. Cl.⁵ .............................. B60R 21/28
[52] U.S. Cl. ..................... 280/739; 280/743 R
[58] Field of Search ............ 280/739, 738, 743 R, 280/728 R; 137/467, 859, 844; 383/103

[56] References Cited

U.S. PATENT DOCUMENTS

| | | |
|---|---|---|
| 3,527,475 | 9/1970 | Carey et al. |
| 3,887,213 | 6/1975 | Goetz |
| 4,097,065 | 6/1978 | Okada et al. |
| 4,181,325 | 1/1980 | Barnett |
| 4,265,468 | 5/1981 | Suszko et al. |
| 5,007,662 | 4/1991 | Abramczyk et al. |

FOREIGN PATENT DOCUMENTS

| | | | |
|---|---|---|---|
| 2944319 | 5/1981 | Fed. Rep. of Germany | 280/739 |
| 4-2543 | 1/1992 | Japan | 280/739 |

Primary Examiner—Karin L. Tyson
Attorney, Agent, or Firm—Tarolli, Sundheim & Covell

[57] ABSTRACT

An inflatable air bag (10, 10a) inflates to restrain a vehicle occupant (13) during a vehicle collision. The air bag has an opening (16, 16a) for venting gas from the interior space (14, 14a) of the air bag. A panel (20, 20a) overlies the opening in the air bag and is secured with, preferably, stitches (22, 22a) to the air bag. The stitches may extend in a generally U-shape along only a portion of the perimeter around the opening in the air bag. Alternatively, the stitches may extend along the entire perimeter around the opening in the air bag. When gas is vented from the interior space of the air bag through the opening in the air bag, the panel restricts flow of the vented gas rearwardly in the vehicle toward the occupant and directs the vented gas forwardly in the vehicle away from the occupant.

3 Claims, 2 Drawing Sheets

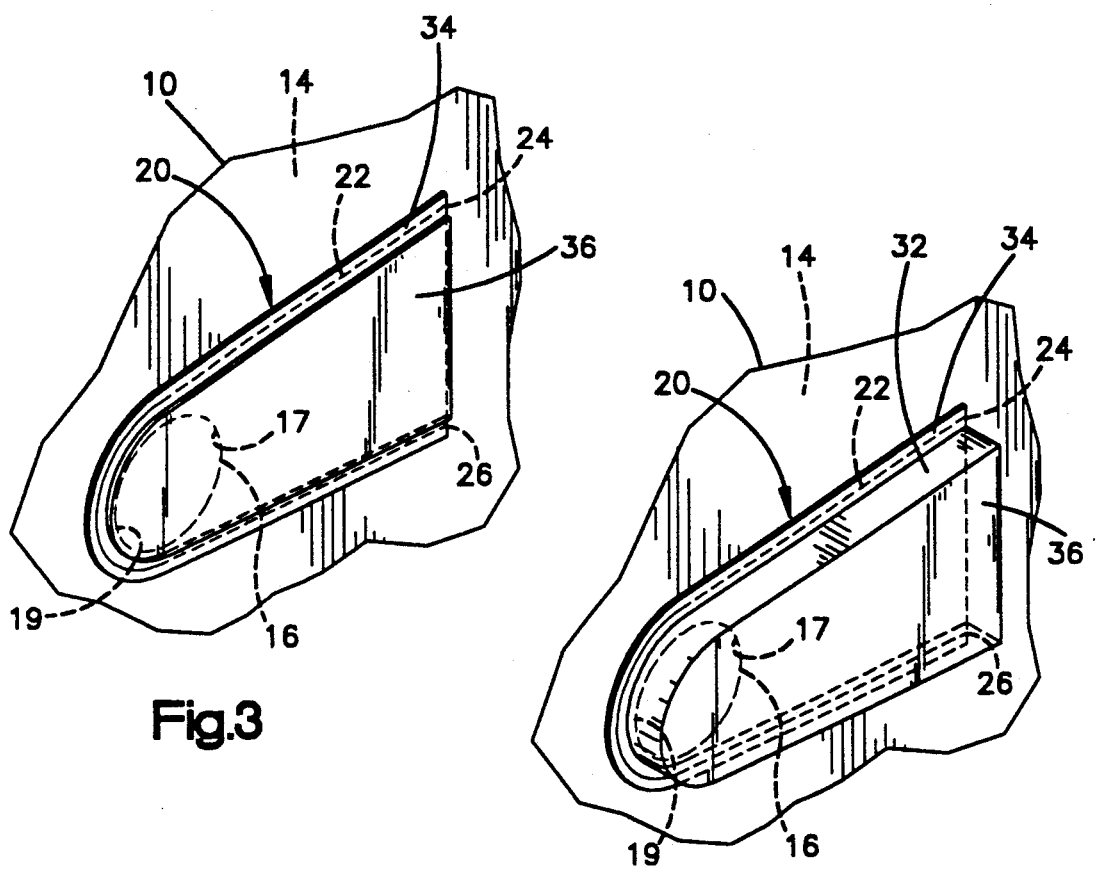
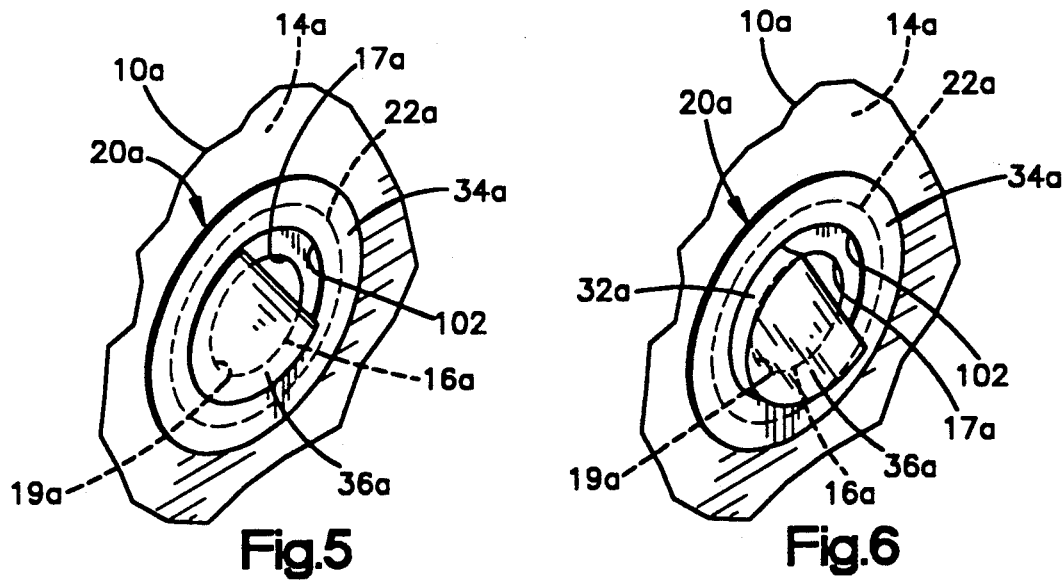

APPARATUS FOR VENTING OF AN INFLATABLE AIR BAG

TECHNICAL FIELD

The present invention relates to an inflatable vehicle occupant restraint system, and is particularly directed to an inflatable air bag for use in a vehicle occupant restraint system.

BACKGROUND ART

A vehicle occupant restraint system having an inflatable air bag is known. Typically, an inflatable air bag is inflated by gas directed into the air bag in response to the vehicle experiencing deceleration indicative of a collision. The inflated air bag absorbs energy resulting from the forward movement of an occupant against the air bag. The energy absorbed by the air bag is dissipated to minimize rebounding of the occupant from the air bag.

One way to dissipate the energy absorbed by the air bag is to vent the gas in the air bag. It is known to vent the gas in the air bag through a vent hole to the atmosphere. The vent hole may be covered with a patch which opens when a predetermined pressure level is reached inside the air bag. When the patch opens, gas inside the air bag passes through the vent hole to the atmosphere.

SUMMARY OF THE INVENTION

In accordance with the present invention, an inflatable air bag inflates to restrain a vehicle occupant during a vehicle collision. The air bag comprises material defining a chamber into which inflation fluid, such as gas, is directed to inflate the air bag. The material has an opening for venting the inflation fluid from the chamber. A panel is secured to the material and overlies the opening. The panel in part defines a passage for directing inflation fluid vented through the opening away from the occupant. Thus, the panel restricts flow of the inflation fluid toward the vehicle occupant.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 3 is an enlarged view of a part of the air bag shown in FIG. 2;

FIG. 4 is a view similar to FIG. 3, but showing parts in a different position;

FIG. 5 is a schematic view showing a second embodiment of the present invention; and FIG. 6 is a view similar to FIG. 5, but showing parts in a different position.

DESCRIPTION OF PREFERRED EMBODIMENTS

The present invention is directed to an inflatable air bag for restraining a vehicle occupant when the vehicle experiences deceleration at a level above a predetermined level which is indicative of a collision. The specific construction of the air bag is not a part of the present invention and may vary.

Figure 1:
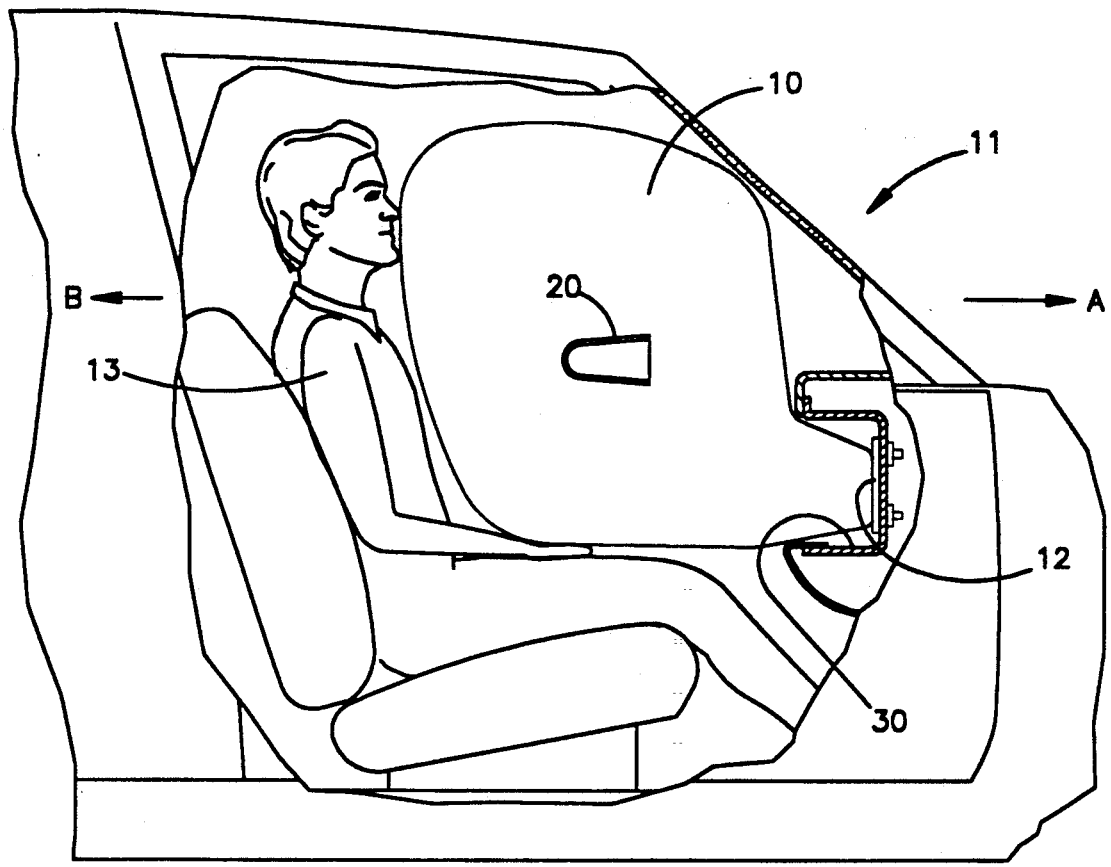
FIG. 1 is a schematic view of an inflatable air bag constructed in accordance with the present invention and incorporated in a vehicle occupant restraint system.

Referring to FIG. 1, an inflatable air bag 10 (shown in FIG. 1 in an inflated condition) is incorporated in a vehicle occupant restraint system 11 for protecting an occupant 13. The vehicle has a forward direction indicated by an arrow A and a rearward direction indicated by an arrow B. Before inflation of the air bag 10, the air bag 10 is typically folded and stored in an air bag storage compartment 30 located in the instrument panel or dashboard of the vehicle. The folded and stored air bag is in a condition ready for deployment upon occurrence of a vehicle collision. It is contemplated that the air bag 10 may be folded and stored in an air bag storage compartment at a different location, such as in the vehicle door or in the steering wheel of the vehicle.

The air bag 10 has an opening 12 (best shown in FIG. 2) through which inflation fluid flows into the interior space 14 of the air bag 10 to inflate the air bag 10. An actuatable inflator (not shown), when actuated, provides the inflation fluid to inflate the air bag 10. Although the opening 12 is shown as rectangularly-shaped, the opening 12 may be of another shape.

The air bag 10 has a circular vent hole 16 (FIG. 2) located on one side 18 of the air bag 10. Although only the one vent hole 16 is shown, there could be a number of other vent holes located on the same side 18 of the air bag 10. Also, some vent holes may be located on the opposite side of the air bag 10. The vent hole 16 (FIGS. 3 and 4) has a front edge portion 17 and a rear edge portion 19 opposite the front edge portion 17.

Figure 2:
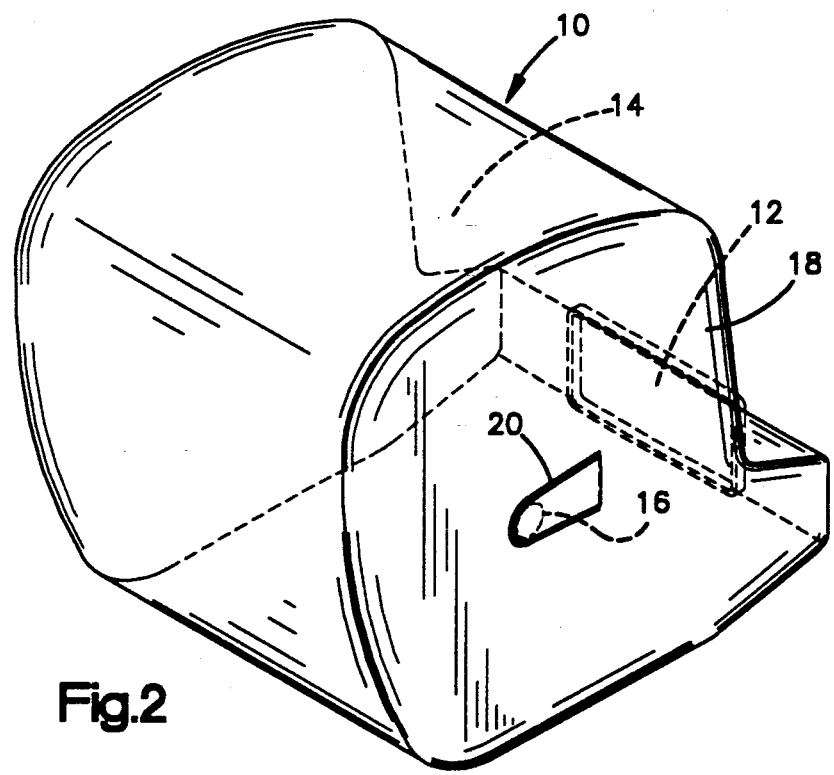
FIG. 2 is an enlarged perspective view of the air bag shown in FIG. 1.

Referring to FIGS. 2-4, a panel 20 overlies the vent hole 16. The panel 20 is shown in FIG. 3 in a closed position and is shown in FIG. 4 in an open position. As best shown in its open position in FIG. 4, the panel 20 includes a foldable portion 32 interconnecting a base portion 34 and a cover portion 36. The foldable portion 32 enables the cover portion 36 to move relative to the base portion 34 such as between the closed position of the panel 20 shown in FIG. 3 and the open position of the panel 20 shown in FIG. 4.

The base portion 34 of panel 20 is secured to the air bag 10 with stitches 22 made of a suitable thread. The stitches 22 surround only a portion of the perimeter around the vent hole 16 in the air bag 10. More specifically, the stitches 22 extend in a generally U-shape around the vent hole 16. The stitches 22 have opposite ends 24, 26 (FIG. 3) located forwardly of the front edge portion 17 of the vent hole 16. The stitches 22 begin at the end 24 and extend in U-shape around the rear edge portion 19 of the vent hole 16. The stitches 22 then terminate at the end 26.

When the panel 20 is in the closed position shown in FIG. 3, the cover portion 36 of the panel 20 adjoins the base portion 34 of the panel 20 and lies against the air bag 10. When the panel 20 is in the open position shown in FIG. 4, the cover portion 36 of the panel 20 is away from air bag 10 and the base portion 34 of the panel 20. Also, when the panel 20 is in the open position shown in FIG. 4, the cover portion 36 of the panel 20 in part defines a passage between the air bag 10 and the cove portion 36. This passage communicates the interior of the air bag 1 with the atmosphere in the interior of the vehicle.

When a vehicle collision occurs, inflation fluid is directed through the opening 12 into the interior space 14 of the air bag 10 to inflate the air bag 10 as shown in FIG. 1. The occupant 13 moves forward against the inflating air bag 10 as inflation fluid continues to flow into the interior space 14 of the air bag 10. The inflating air bag 10 absorbs the energy resulting from movement of the occupant 13 against the air bag 10. As the inflating air bag 10 absorbs the energy resulting from movement of the occupant 13 against the air bag 10, the pressure in the interior space 14 of the air bag 10 increases. When the pressure in the interior space 14 of the inflating air bag 10 reaches a predetermined pressure, the panel 20 moves from the closed position shown in FIG. 3 to the open position shown in FIG. 4 due to the increased pressure in the interior space 14 of the inflating air bag 10. When the panel 20 moves to the open position shown in FIG. 4, inflation fluid in the interior space 14 of the air bag 10 flows through the vent hole 16 to relieve the pressure in the interior space 14 of the air bag 10.

The panel 20 restricts flow of the vented inflation fluid rearwardly in the vehicle toward the occupant 13. The panel 20 also directs the vented inflation fluid forwardly in the vehicle away from the occupant 13. The panel 20 in part defines a passage for directing inflation fluid vented through the vent hole 16 forwardly in the vehicle and away from the occupant 13.

Another embodiment of the present invention is illustrated in FIGS. 5 and 6. Since the embodiment of the invention illustrated in FIGS. 5 and 6 is generally similar to the embodiment of the invention illustrated in FIGS. 1-4, similar numerals are utilized to designate similar components, the suffix letter "a" being associated with the embodiment of FIGS. 5 and 6 to avoid confusion.

Referring to FIGS. 5 and 6, a panel 20a is circularly-shaped and overlies a circular vent hole 16a in an air bag 10a. The vent hole 16a has a front edge portion 17a and a rear edge portion 19a opposite the front edge portion 17a. The panel 20a is shown in FIG. 5 in a closed position and is shown in FIG. 6 in an open position. As best shown in its open position in FIG. 6, the panel 20a includes a foldable portion 32a interconnecting a base portion 34a and a cover portion 36a. The foldable portion 32a enables the cover portion 36a to move relative to the base portion 34a such as between the closed position of the panel 20a shown in FIG. 5 and the open position of the panel 20a shown in FIG. 6.

The cover portion 36a of the panel 20a covers only a portion of the vent hole 16a. The cover portion 36a of the panel 20a has a D-shaped opening 102 which aligns in part with that portion of the vent hole 16a not covered by the cover portion 36a. The base portion 34a of the panel 20a is secured to the air bag 10a with stitches 22a made of a suitable thread. The stitches 22a extend around the entire perimeter of the vent hole 16a to secure the panel 20a to the air bag 10a.

When the pressure in the interior space 14a of the air bag 10a reaches a predetermined pressure, the panel 20a moves from the closed position shown in FIG. 5 to the open position shown in FIG. 6 due to the increased pressure in the interior space 14a of the inflating air bag 10a. When panel 20a moves to the open position shown in FIG. 6, inflation fluid in the interior space 14a of the air bag 10a flows through the vent hole 16a to relieve the pressure in the interior space 14a of the air bag 10a. The panel 20a restricts flow of the vented inflation fluid rearwardly in the vehicle toward an occupant (not shown) and directs the vented inflation fluid forwardly in the vehicle away from the occupant. The panel 20a in part defines a passage for directing inflation fluid vented through the vent hole 16a forwardly in the vehicle and away from the occupant.

From the above description of the invention, those skilled in the art to which the present invention relates will perceive improvements, changes and modifications. Such improvements, changes and modifications within the skill of the art to which the present invention relates are intended to be covered by the appended claims.

Having described the invention, the following is claimed:

1. An inflatable air bar for, when inflated, restraining a vehicle occupant, said air bag comprising:

air bag material having an outer surface area and an inner surface area which defines a chamber into which inflation fluid is directed to inflate said air bag;

said air bag material including a surface area extending between said outer and inner surface areas and defining an opening for venting inflation fluid from said chamber;

a panel disposed on said outer surface area of said air bag material and including (i) a first portion fixedly secured to said outer surface area of said air bag material and surrounding said opening entirely, and (ii) a second portion attached to said first portion and overlaying only part of said opening, said second portion being movable from a blocking position in which said second portion blocks only part of said opening to a non-blocking position in which said second portion unblocks said opening and directs inflation fluid vented through said opening away from the occupant; and means for fixedly securing said first portion of said panel to said outer surface area of said air bag material.

2. An inflatable air bag according to claim 1 wherein said means for fixedly securing said first portion of said panel includes stitches.

3. An inflatable air bag according to claim 2 wherein said stitches surround the entire perimeter around said opening in said air bag material.

* * * * *